United States Patent [19]
Nakamura

[11] Patent Number: 5,493,157
[45] Date of Patent: Feb. 20, 1996

[54] BRUSHLESS MOTOR HAVING CORELESS COIL ASSEMBLY

[75] Inventor: Nobuaki Nakamura, Fujieda, Japan

[73] Assignee: Victor Company of Japan, Ltd., Yokohama, Japan

[21] Appl. No.: 122,250

[22] Filed: Sep. 16, 1993

[30] Foreign Application Priority Data

Sep. 18, 1992 [JP] Japan .................................. 4-275424
Sep. 24, 1992 [JP] Japan .................................. 4-279477

[51] Int. Cl.⁶ .......................... H02K 7/14; H02K 1/12; H02K 3/26
[52] U.S. Cl. ............ 310/67 R; 310/254; 310/DIG. 6; 310/208
[58] Field of Search ........................ 310/51, 90, 67 R, 310/208, 254, DIG. 6; 360/98.07, 99.08, 99.04; 361/748, 749

[56] References Cited

U.S. PATENT DOCUMENTS

| | | | |
|---|---|---|---|
| 4,665,331 | 5/1987 | Sudo et al. | 310/DIG. 6 |
| 4,833,568 | 5/1989 | Berhold | 361/749 |
| 4,900,958 | 2/1990 | Kitahara et al. | 310/67 R |
| 4,950,527 | 8/1990 | Yamada | 361/749 |
| 4,962,329 | 10/1990 | Fujita et al. | 310/208 |
| 5,006,765 | 4/1991 | Schmider | 310/67 R |
| 5,012,571 | 5/1991 | Fujita et al. | 310/254 |
| 5,177,650 | 1/1993 | Jabbari et al. | 360/99.08 |
| 5,334,895 | 8/1994 | Morioka et al. | 310/67 R |

FOREIGN PATENT DOCUMENTS

| | | | |
|---|---|---|---|
| 59-201669 | 11/1984 | Japan | 310/254 |
| 61-42262 | 2/1986 | Japan | 310/254 |
| 61-142954 | 6/1986 | Japan | 310/254 |
| 61-214761 | 9/1986 | Japan | 310/254 |
| 62-22269 | 1/1987 | Japan | 360/99.08 |
| 62-144553 | 6/1987 | Japan . | |
| 139247 | 2/1989 | Japan . | |
| 1-206860 | 8/1989 | Japan | 310/51 |
| 213249 | 1/1990 | Japan . | |
| 458747 | 2/1992 | Japan . | |
| 4255441 | 9/1992 | Japan . | |

Primary Examiner—Clayton E. LaBalle
Attorney, Agent, or Firm—Michael N. Meller

[57] ABSTRACT

A brushless motor of the present invention generally has a stator and a rotor in a clean chamber of contaminant free atmosphere. The stator has a motor base, a shaft provided on the motor base and a plurality of coils on the motor base. The rotor has a bearing holder having a center hole for supporting bearings, a hub connected to the bearing holder for mounting information storage discs such as hard discs and a magnet having magnetic poles provided on the hub facing to the coils. The brushless motor of the present invention further has a top cover provided on the bearing holder for covering the center hole thereof, a cylindrical chamber defined by an outer wall of the bearing holder and an inner wall of the hub in the rotor, the magnet is provided on the inner wall of the bearing holder, and a coreless coil assembly having the plurality of coils without cores made of magnet materials being provided on the motor base in such a manner that the coreless coil assembly protrudes into the cylindrical chamber so as to form narrow clearances between the walls of the cylindrical chamber and the coreless coil assembly for a labyrinth path in the clean chamber.

4 Claims, 16 Drawing Sheets

BRUSHLESS MOTOR HAVING CORELESS COIL ASSEMBLY

BACKGROUND OF THE INVENTION

1. Field of the Invention

The present invention relates to a brushless motor, in particular, to improvements of a sealing structure of a bearing portion in a spindle motor used for HDD (hard disc drive) and other disc type driving device.

2. Description of the Related Art

Presently, in order to rotate a storage disc such as "Hard Disc" (referred to as "HD") in a sealed housing of disc storage systems, a Hard Disc Drive (HDD) is widely used.

As a spindle motor for driving the HDD in a prior art, a brushless motor for instance, is employed as shown in FIG. 1.

FIG. 1 is a vertical sectional view showing a right half side of a brushless motor along a center axis of a shaft in a prior art.

Referring to FIG. 1, a hub 16 is rotatably provided on a shaft 10 through bearings 12, 14. The shaft 10 is integrally formed on a motor base 18 which is fixed on a chassis (not shown). A plurality of coils 20 each wound around a core made of a magnetic material are provided around a bottom portion of the shaft 10 in a lower position, and a magnetic 22 having a plurality of magnetic poles is provided on an inner surface of a yoke formed in the hub 16 in such a manner that the plurality of magnetic poles of the magnet 22 respectively face the plurality of coils 20.

The hub 16 is provided with a disc holder 24 on an outer surface thereof in a lower position on which a lower hard disc 28 is clamped by a clamper 26. Further, another upper hard disc 28 is clamped on the clamper 26 by another clamper 30 which is fixed on a upper surface of the hub 16. An access to each of the upper and lower hard discs 28, 28 is made from both the sides thereof by a pair of magnetic heads 32a, 32b.

Further, a sleeve 34 is provided on the shaft 10 in a upper position, and a ring magnet 36 is provided on a inner surface of the hub 16 in such a manner that the ring magnet 36 faces to the sleeve 34. Magnetic fluid seal 38 is filed between the sleeve 34 and the ring magnet 36 for sealing the bearings 12, 14, so that contaminant particles scattered from the bearings 12, 14 and the coils 20 are prevented from invading an area EB (referred to as clean room) sealed from the outer environment EA, in which clean chamber EB the hard discs 28, 28 are installed.

Upon operation, the coils 20 is applied with a current from a switching circuit (not shown) by which a direction and an interval of the current are controlled so that the hub 16 is rotated in a direction of an arrow FA due to an interaction between a magnetic field produced by the magnet 22 and a magnetic field generated by the coils 20. Thus, the upper and lower hard discs 28, 28 are rotated with respect to the pairs of magnetic heads 32a, 32b. The pairs of magnetic heads 32a, 32b give access to desired tracks of the upper and lower hard discs 28, 28 by being traversed in right and left directions.

In the above prior art, however, there are disadvantages as follows:

(1) Generally in a brushless motor like shown in FIG. 1, the bearings 12, 14 and coils 20 scatter contaminant particles such as dust and grease particles, which invade the clean chamber EB to contaminate the atmosphere therein, thus, the Contact Start and Stop characteristic (CSS) of the HDD is degraded even when the contaminant particle sizes are as small as 0.1~0.3 μm. In the aforementioned prior art, the magnetic fluid seal 38 is employed to prevent the contaminant particles from invading the clean chamber EB where the hard discs 28, 28 are installed, which poses a cost increase of the brushless motor because of a high price of the magnetic fluid seal 38.

(2) As shown in FIG. 1, however, the contaminant particles of dust and grease have chances to invade the clean chamber EB through gaps between the magnet 22 and the coils 20, these also degrades cleanness of the atmosphere of the clean chamber EB.

(3) Recently, there is a demand for down-sizing of the HDD so as to enable an employment of the HDD in a notebook-type personal computer, so that its spindle motor is also required to have a good sealing characteristic against the contaminant particles without increasing a size and weight thereof.

In order to decrease the size and weight of a brushless motor, it is conceivable for the brushless motor to employ coreless coils instead of the coils 20 having cores made of magnetic materials.

A description is now given to an assembly method of the coreless coil in a prior art.

FIG. 2(A) is a perspective view of a plane coil of a prior art before the plane coil is assembled to a motor.

FIG. 2(B) is a fragmentary view taken in the direction of the arrows along the #2—#2 line of FIG. 2(A). FIG. 2(C) is a plan view showing a metal mold for preforming plural pieces of the plane coils shown in FIG. 2(A). FIG. 2(D) is a perspective view showing a configuration of the plane coil after it is preformed.

Referring to FIGS. 2(A) and 2(B), at first, a plane coil 90 is formed so as to have a flat configuration by winding a wire 92 around a frame or without the frame.

Next, referring to FIG. 2(C), a predetermined plurality of the plane coils 90 are disposed in a space defined by a metal mold jig 94 having a cylindrical configuration and a pair of metal mold jigs 96, 96 each having an arcuate cylindrical recess. Then, the plurality of the plane coils 90 are pushed against the metal mold jig 94 by causing the pair of metal mold jigs 96, 96 to displace in directions of arrows FA, FA, so that the plurality of the plane coils 90 are bent along a periphery of the metal mold jig 94. Thus, each of the plurality of plane coils 90 forms a arcuate cylindrical shape corresponding to the cylindrical configuration of the metal mold jig 94 as shown with a chain line in FIG. 2(D).

Next, after resin is filled into the space formed by the metal mold jigs 94, 96 in a direction of an arrow FB, the resin is cured by heat, thus, a coreless coil assembly 98 is obtained as shown in FIG. 3.

FIG. 3 is a perspective view showing a coreless coil assembly of a prior art.

It is conceivable that the coreless coil assembly 98 is provided, for instance, on a stator side in the brushless motor so that the hub 16 is rotated by an interaction between the magnetic field produced by the magnet 22 and the magnetic field generated by the coreless coil assembly 98.

In the above prior art, however, the contaminant particles such as dust and grease particles can not be prevented from invading the clean chamber EB through gaps between the magnet 22 and the coreless coils 90, which degrades the cleanliness of atmosphere of the clean chamber EB.

SUMMARY OF THE INVENTION

Accordingly, a general object of the present invention is to provide a brushless motor having a coreless coil assembly in which the above disadvantages have been eliminated.

A more specific object of the present invention is to provide a brushless motor having a coreless coil assembly which forms a labyrinth path between the magnet and the coreless coil assembly for preventing contaminant particles from invading the clean chamber.

Another and more specific object of the present invention is to provide a brushless motor having a stator and a rotor in a contaminant free environment, the stator comprising a motor base, shaft means provided on the motor base and a plurality of coils on the motor base, the rotor comprising a bearing holder having a center hole for supporting bearing means, a hub connected to the bearing holder for mounting information storage discs and a magnet having magnets poles provided on the hub facing to the coils, the rotor having the hub being rotated around the shaft means through the bearing means by causing a magnetic field produced from the magnetic poles of the magnet to interact a magnetic field generated by the coils in the clean chamber, wherein the brushless motor further comprising, a top cover provided on the bearing holder for covering the center hole thereof, a space defined by an outer wall of the bearing holder and an inner wall of the hub in the rotor, the magnet is provided on the inner wall of the hub, and a coreless coil assembly having a plurality of coil windings having no cores made of magnet materials being provided on the motor base in such a manner that the coreless coil assembly protrudes into the space so as to form narrow clearances between the inner wall of the hub and the coreless coil assembly as a labyrinth path to the clean chamber.

Other objects and further features of the present invention will be apparent from the following detailed description when read in conjunction with the accompanying drawings.

BRIEF DESCRIPTION OF THE DRAWINGS

Preferred examples of the present invention will be described with reference to the accompanying drawings wherein.

DETAILED DESCRIPTION OF THE PREFERRED EMBODIMENT

Figure 1:
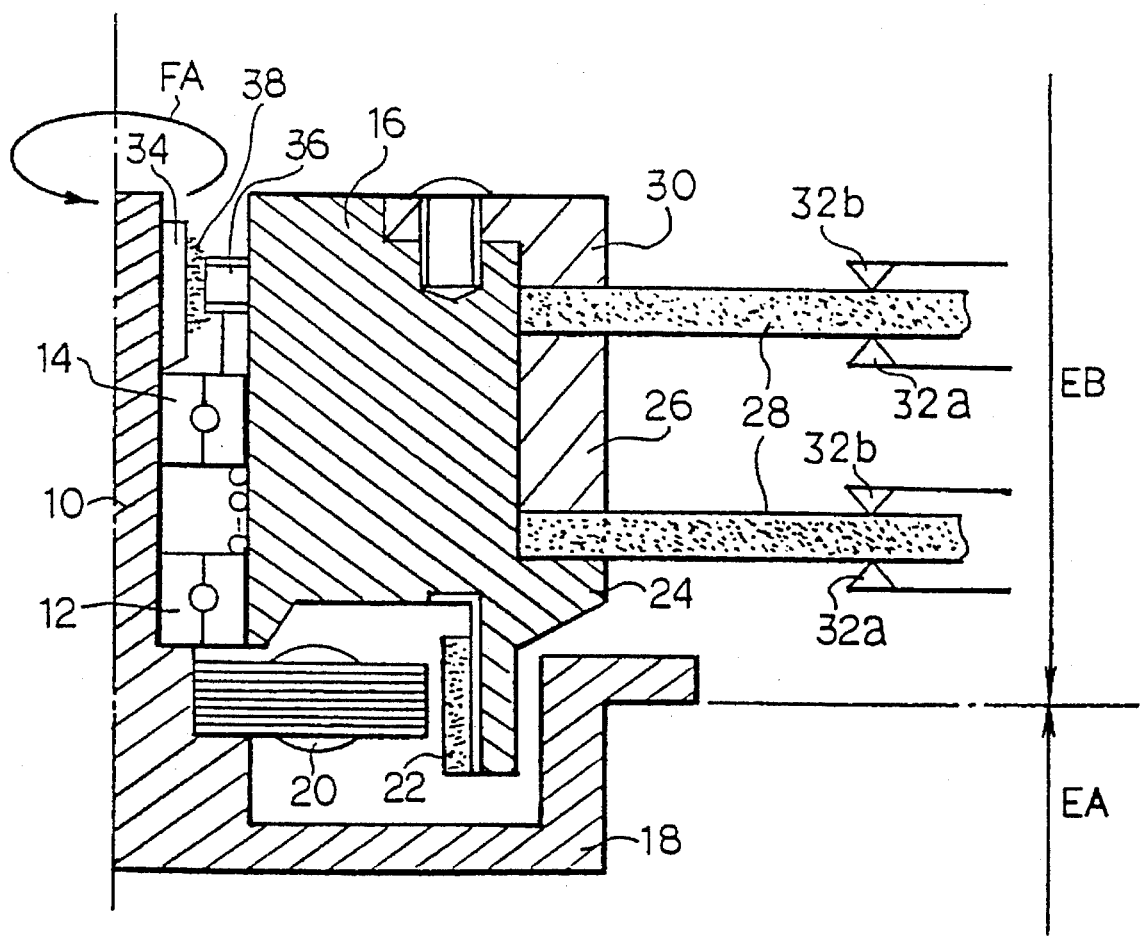
FIG. 1 is a vertical sectional view showing a right halfside of a brushless motor cut of along a center axis of a shaft in a prior art.
Figure 2A:
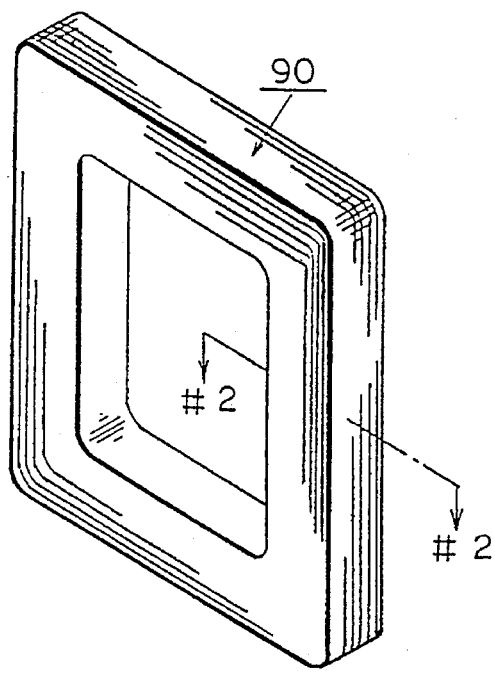
FIG. 2(A) is a perspective view of a plane coil of a prior art before the plane coil is assembled.
Figure 2D:
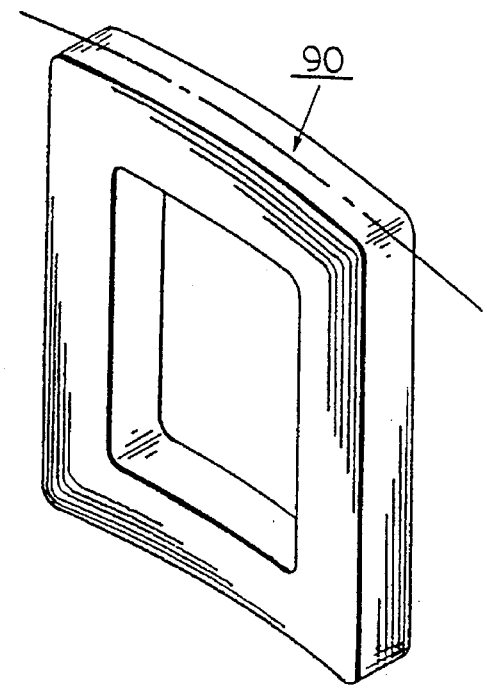
FIG. 2(D) is a perspective view showing a configuration of the plane coil after the plane coil is assembled.
Figure 2B:
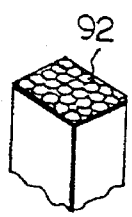
FIG. 2(B) is a fragmentary view taken in the direction of the arrows along the #2—#2 line in FIG. 2(A).
Figure 2C:
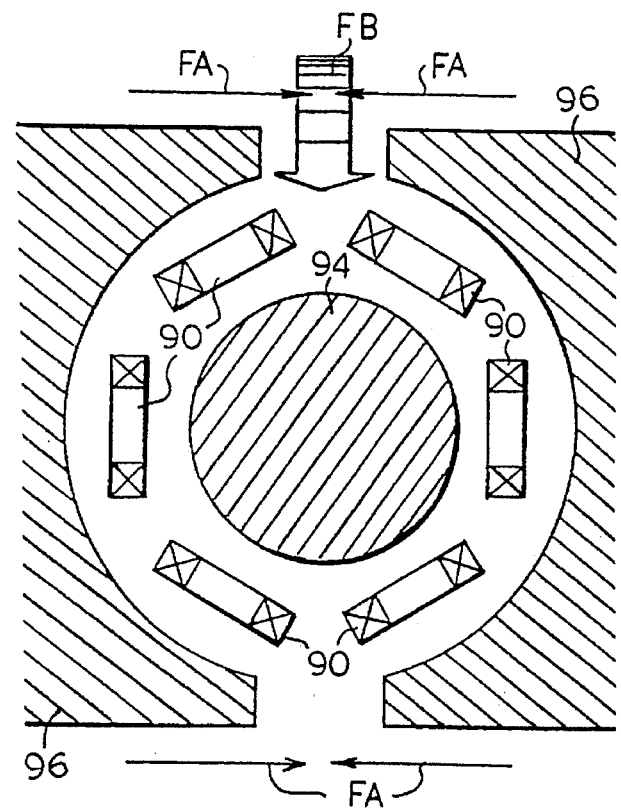
FIG. 2(C) is a plan view showing a metal mold for forming a coreless coil assembly using a plural pieces of the plane coils shown in FIG. 2(A).
Figure 3:
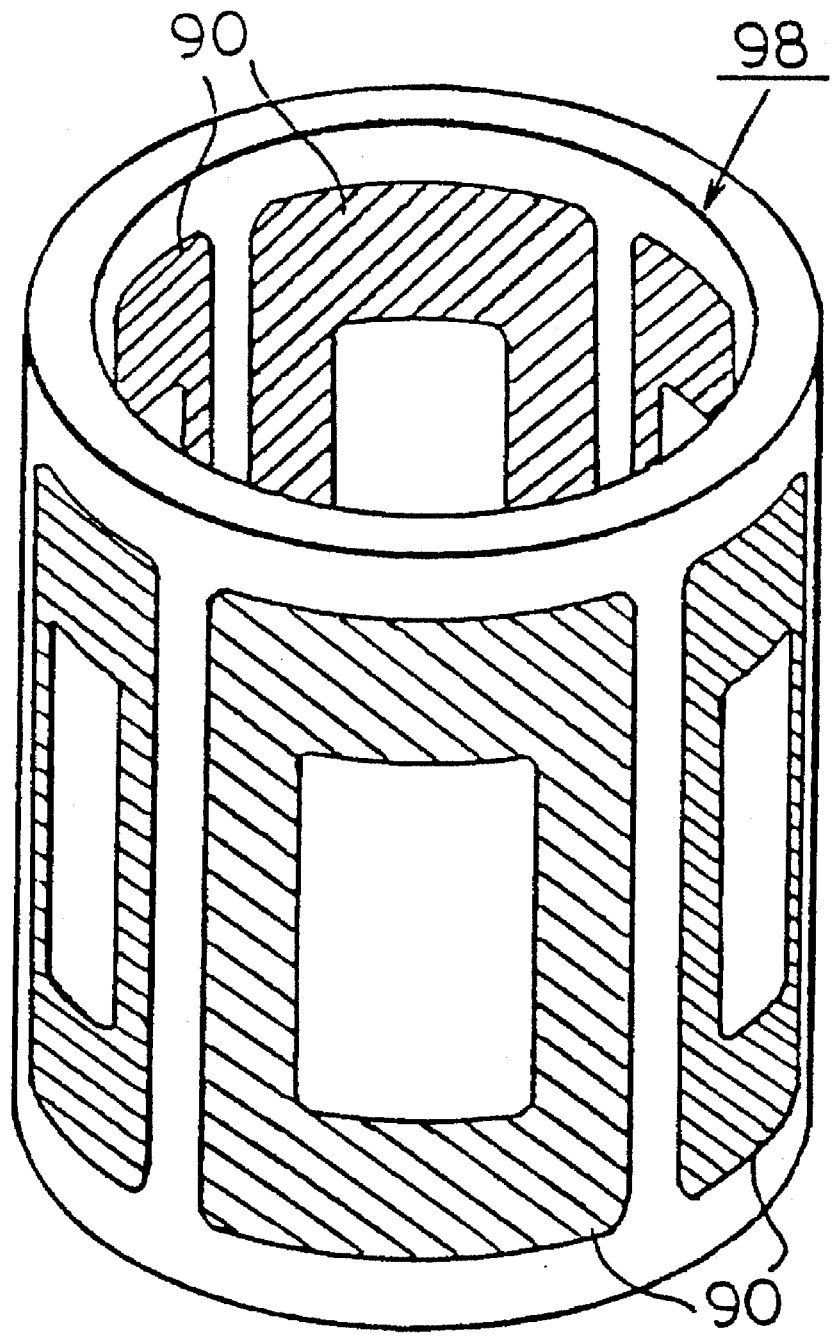
FIG. 3 is a perspective view showing a coreless coil assembly of a prior art.

[First embodiment of the brushless motor 11]

A description is given to a first embodiment of the brushless motor 11 of the present invention referring to FIG. 4–FIG. 10, wherein like reference numerals and symbols designate like or corresponding parts of the prior art, and the detailed description is omitted for simplicity.

Figure 4:
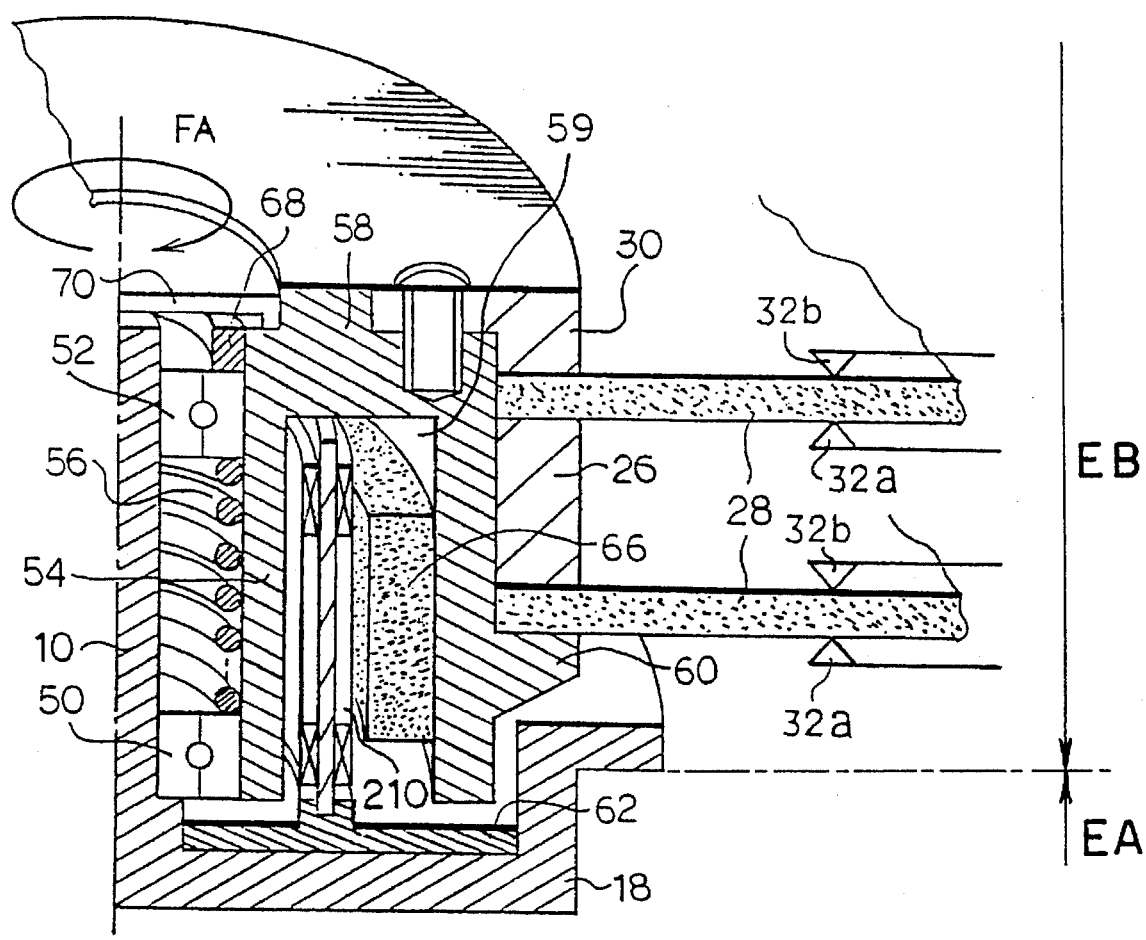
FIG. 4 is a view, partially in vertical section, showing a right half side of a brushless motor cut along a center axis of a shaft in the present invention.

FIG. 4 is a view, partially in vertical section, showing a right half side of a brushless motor cut along a center axis of a shaft in the present invention.

Figure 5:
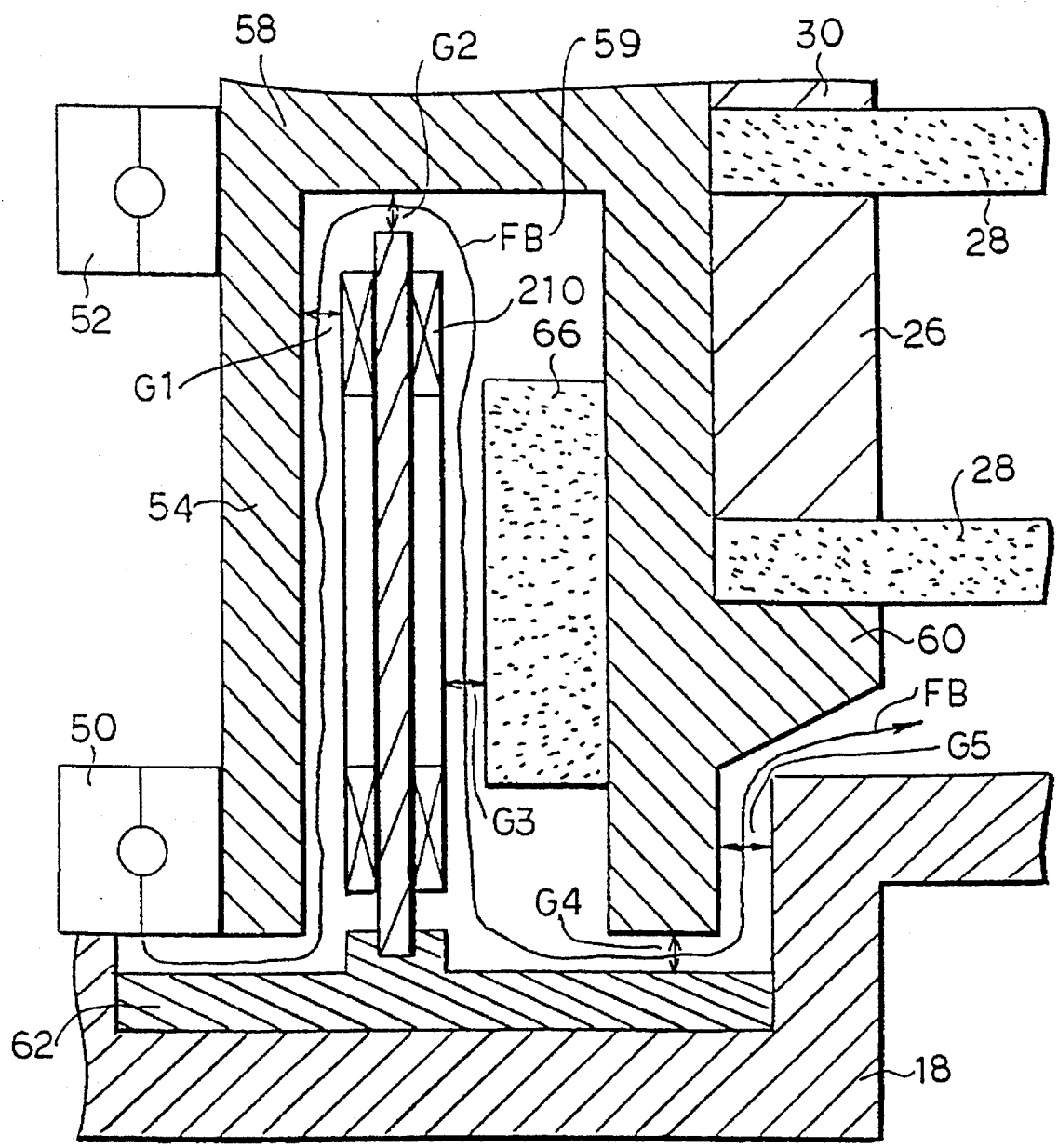
FIG. 5 is a fragmentary enlarged sectional view of a main part of the brushless motor shown in FIG. 4.

FIG. 5 is a fragmentary enlarged sectional view of a main part of the brushless motor shown in FIG. 4.

Referring to FIG. 4, as a rotor, a cylindrical bearing holder 54 having a center hole is rotatably provided on the shaft 10 through bearings 50, 52 in such a manner that the bearing holder 54 supports the bearings 50, 52 in the center hole thereof. As a stator, the shaft 10 is integrally provided on a motor base 18 which is fixed on a chassis (not shown). A coil spring 56 is installed between the bearings 50, 52 so as to provide a pre-load thereto.

A hub 58 having an L-shaped configuration in a vertical section is integrally connected to the bearing holder 54 so as to form a cylindrical chamber 59 between an inner wall of the hub and an outer wall of the bearing holder 54.

A disc holder 60 is protrudingly provided on an outer skirt of the hub 58. A lower hard disc 28 having a center hole is coaxially mounted on the disc holder 60 of the hub 58 by causing the center hole thereof to be snug fitted into the hub 58, and is held thereon with a lower clamper 26 having a center hole by causing the center hole thereof to be inserted into the hub 58. An upper hard disc 28 is also coaxially mounted and fixed on the disc holder 60 of the hub 58 in such a manner that the upper disc 28 is interposed between the lower clamper 26 and an upper clamper 30 which is mounted on the upper surface of the hub 58 with screws. Access to each of the upper and lower hard discs 28, 28 is given by a pair of the magnetic heads 32a, 32b.

A magnet 66 having a plurality of magnetic poles is provided on the inner wall of the hub 58.

As clearly shown in FIG. 5, a coreless coil assembly 210 having a cylindrical configuration as mentioned hereafter is provided on a coil holder 62 placed on an upper surface of the motor base 18 in such a manner that the coreless coil assembly 210 protrudes in the cylindrical chamber 59 so as to form a first clearance G1 between the outer surface of the bearing holder 54 and the coreless coil assembly 210, a second clearance G2 between an inner surface of the hub 58 and a top of the coreless coil assembly 210, and a third clearance G3 between a surface of the magnet 66 and the coreless coil assembly 210. Further, a fourth clearance G4 is formed between the upper surface of the coil holder 62 and a bottom surface of the hub 58 and a fifth clearance G5 between an outer surface of the hub 58 and the upper surface of the motor base 18, wherein the clearances G1~G5 are determined to be 0.05~0.8 mm. There is no air passages around a bottom end of the coreless coil assembly 210. Thus, a path shown with an arrow FB from the bearings 50, 52 to the clean chamber EB becomes longer than that of the prior art, which effectively serves as a labyrinth path called "labyrinth seal" for preventing the contaminant particles from invading the clean chamber EB.

Referring to FIG. 4 again, the bearing 52 is pushed downward by a ring member 68 in the center hole of the bearing holder 54, and a top cover 70 is placed on a top of the bearing holder 54 to cover the center hole thereof and fixed thereon by means of such as a bond, wherein the top cover 70 serves as a seal for preventing the contaminant particles of dust and grease from invading the clean chamber instead of the magnetic fluid seal 38 shown in FIG. 1.

Next, a description is given to a first embodiment of the coreless coil assembly 210 referring to FIGS. 6~10.

Figure 6:
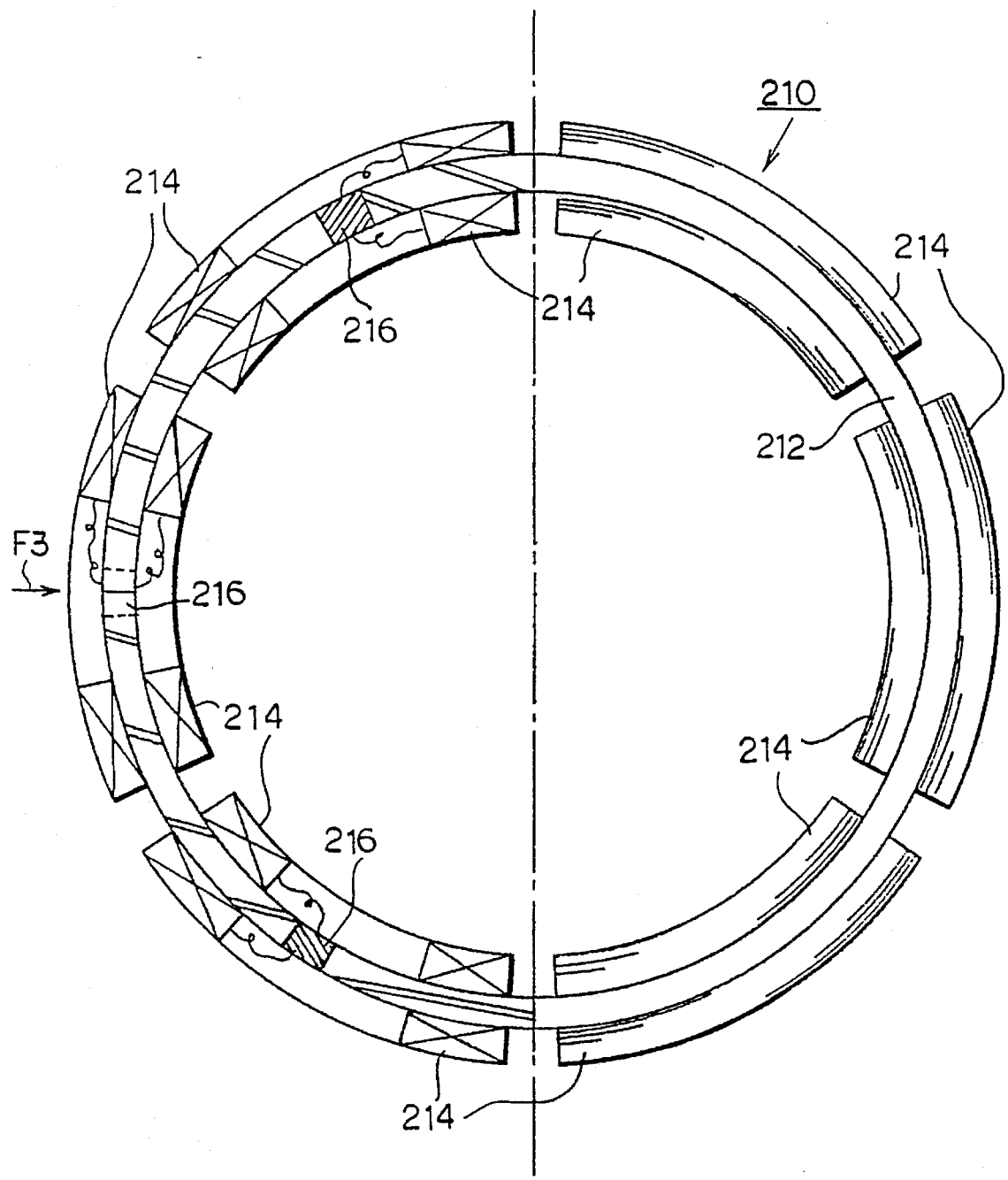
FIG. 6 is a plane view, partially in cross-section in a left half side, showing a coreless coil assembly of a first embodiment of the present invention.

FIG. 6 is a plan view, partially in cross-section in a left half side, showing a coreless coil assembly of a first embodiment of the present invention.

Figure 7:
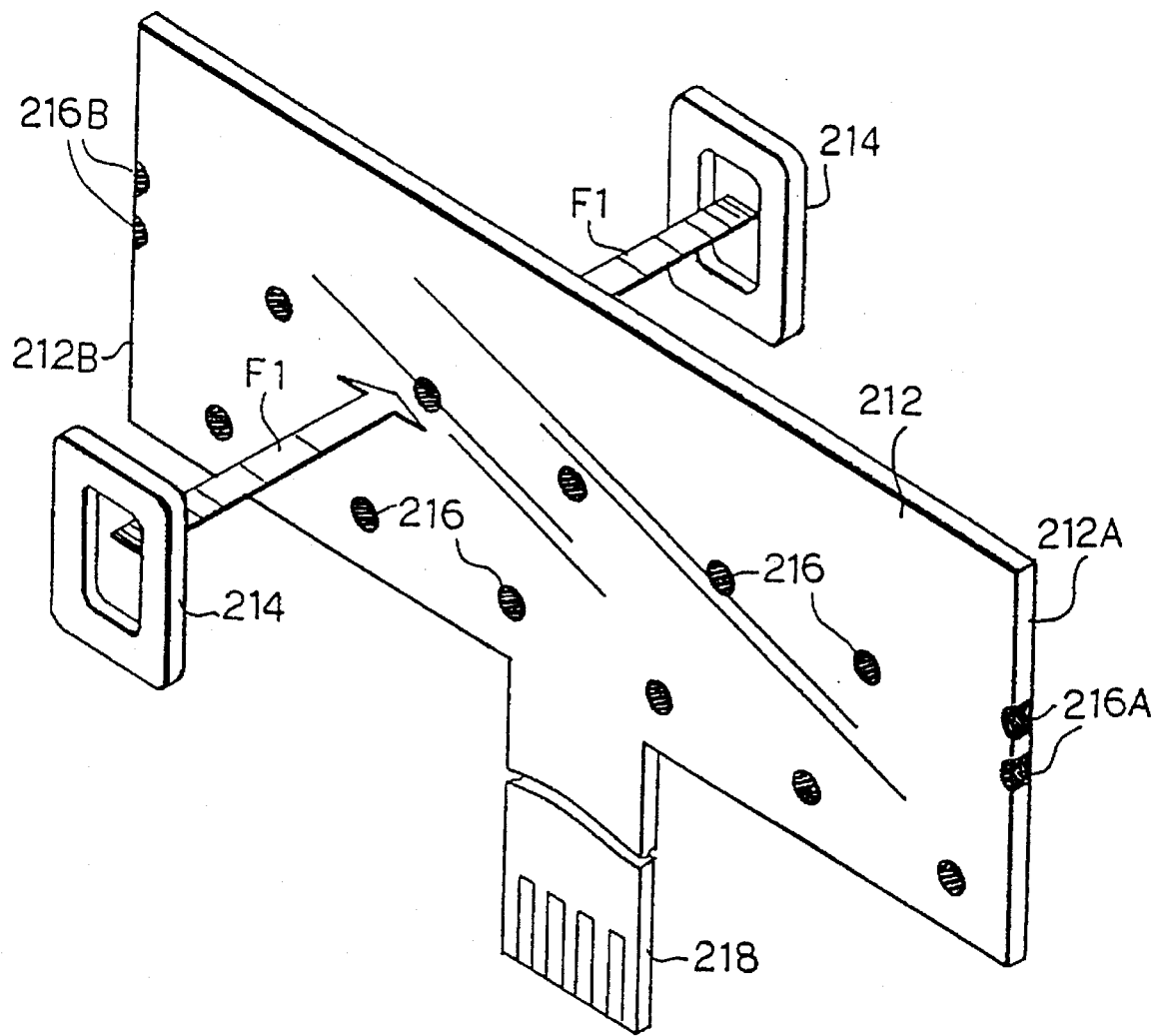
FIG. 7 is a perspective view showing a flexible print circuit used in the coreless coil assembly shown in FIG. 6.

FIG. 7 is a perspective view showing a flexible print circuit of the coreless coil assembly shown in FIG. 6.

Figure 8:
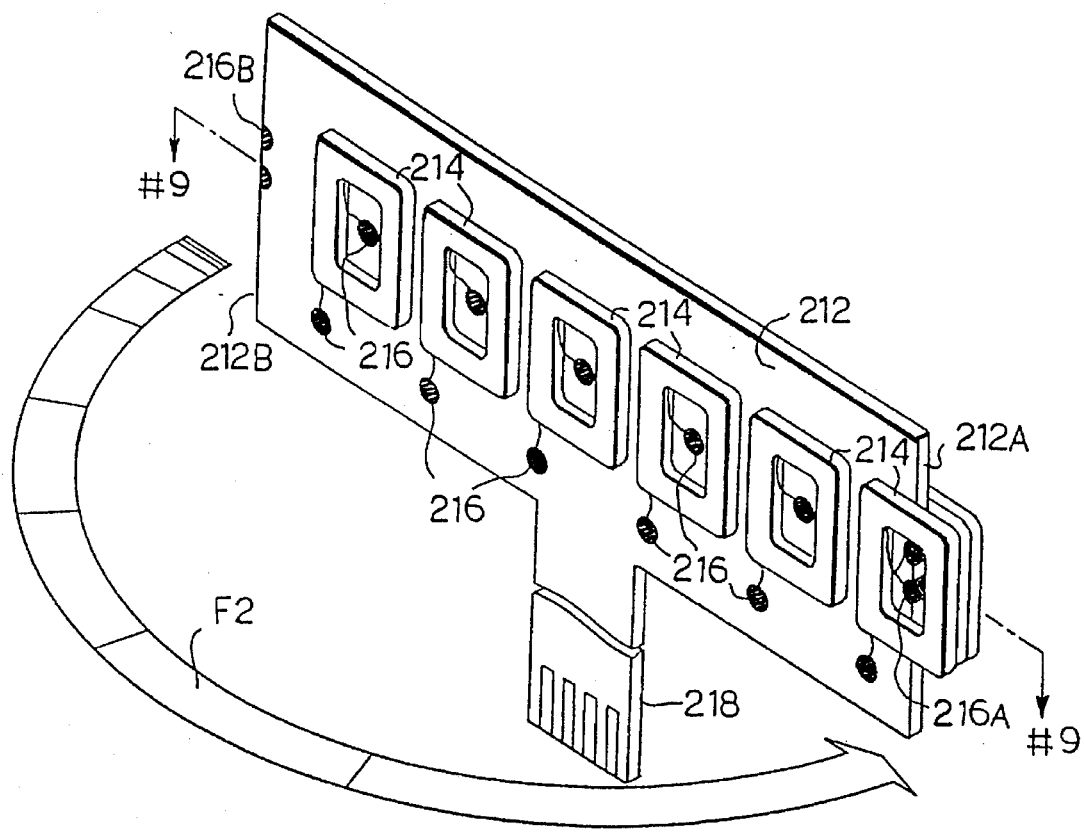
FIG. 8 is a perspective view showing an assembling state of the first embodiment of the coreless coil assembly.

FIG. 8 is a perspective view showing an assembling state of the first embodiment of the coreless coil assembly.

Figure 9:
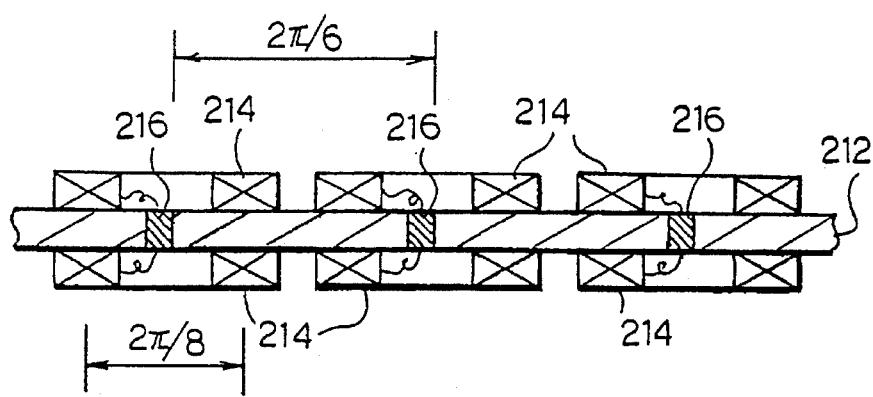
FIG. 9 is a fragmentary cross-sectional view taken along the line #9—#9 of FIG. 8.

FIG. 9 is a fragmentary cross-sectional view taken along the line #9—#9 of FIG. 8.

Figure 10:
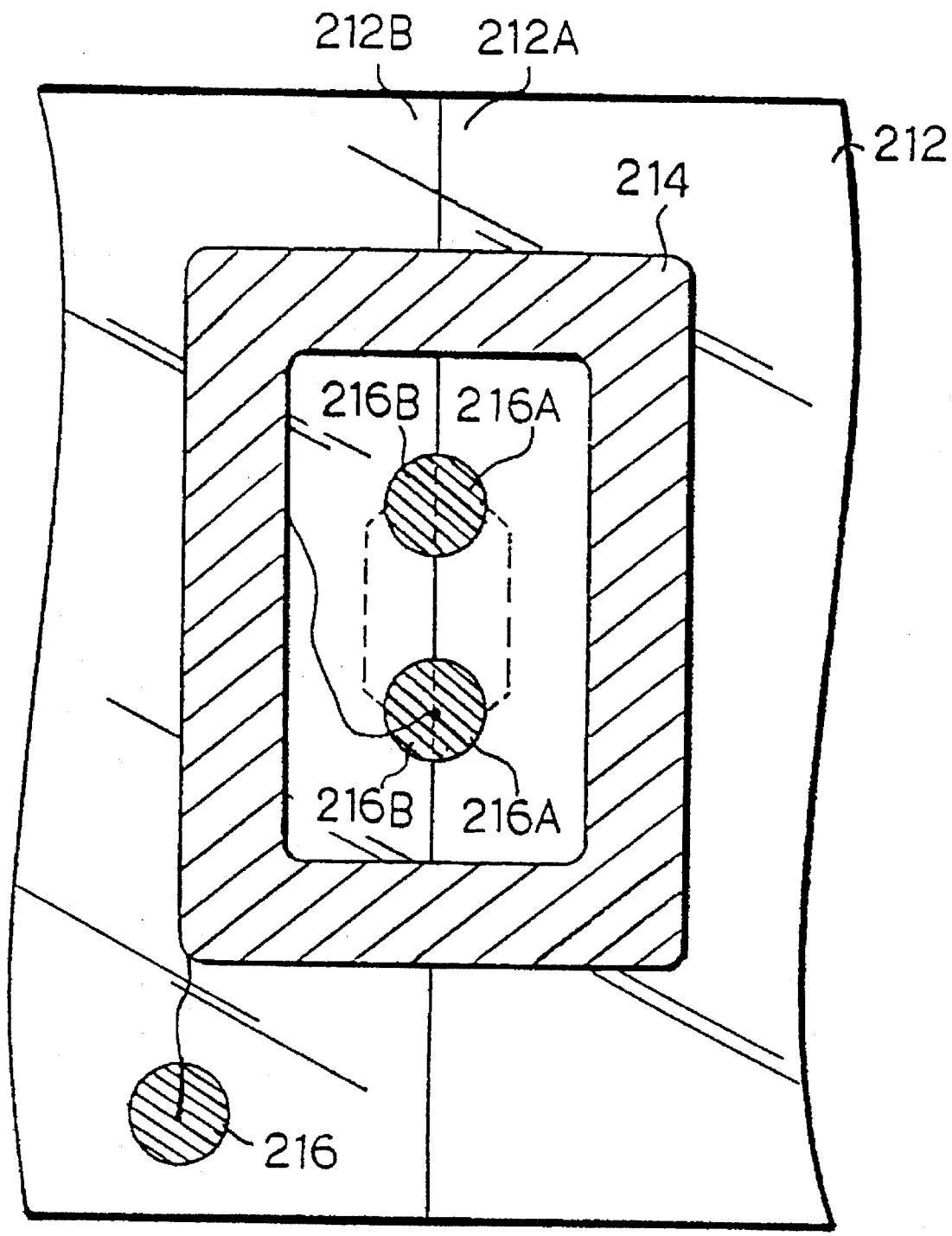
FIG. 10 is a fragmentary side view taken in the direction of the arrow F3 of FIG. 6.

FIG. 10 is a fragmentary side view taken in the direction of the arrow F3 of FIG. 6.

Referring to FIG. 6, a coreless coil assembly 210 generally comprises a cylindrical Flexible Printed Circuit (referred to as FPC) 212 and a plurality of plane coils 214 attached to inner and outer sides of the FPC 212. The cylindrical FPC 212 has a cylindrical flexible support on which predetermined print circuits of such as star or delta connection are provided together with through-hole lands 216, and winding ends of the plane coils 214 attached thereon are connected to through-hole lands 216. Thus, the winding ends of the plane coils 214 can be connected to the through-hole lands 216 from both side surfaces, i.e., an inner or an outer side surface, of the FPC 212.

Next, a further detailed description is given to a manufacturing method and a construction of the coreless coil assembly 210.

Referring to FIG. 7, at first, a sheet of FPC 212 is prepared. The FPC 212 has a flexible base on which desired print circuits (not shown) corresponding to the connection of star or delta etc. are printed and are connected to the through-hole lands 216 provided thereon. These through-hole lands 216 are provided on the FPC 212 taking account of the positions of the plane coils 214 to be attached thereon. For instance, when the brushless motor 11 comprises the magnet 66 having 8 magnetic poles and 6 pairs of plane coils 214, and is driven by a 3-phase alternating current, the magnet 66 is magnetized to form 8 magnetic poles every $2\pi/8$ rad of electrical angle therein, and each of the 6 pairs of plane coils 214 is disposed on the FPC every $2\pi/6$ rad electrical angle as shown in FIG. 9.

Further, a pair of through-holes ends 216A, 216B having a semicircle configuration are respectively provided at both ends of the FPC 212 having the same height so that the through-holes 216A and 216B make up a round through-hole like the through-hole 216 when they meet each other as the FPC 212 is rolled to a cylinder. Furthermore, a terminal portion 218 is provided on the lower portion of the FPC 212 for connecting the print circuit to a driving circuit (not shown) of the HDD.

Next, a plurality of pairs of the plane coils 214, 214 are respectively attached to both the side surfaces of the FPC 212 so as to face each other at predetermined intervals in a longitudinal direction of the FPC 212 by means of liquid-proof bonding or bonding tapes as shown in FIG. 7. The winding ends of the plane coils 214 are respectively connected to the through-hole lands 216 and the pair of through-hole lands 216A by means of soldering as shown in FIG. 8.

Referring to FIG. 9, the through-hole lands 216, 216A, are exposed on both side surfaces of the FPC 212, i.e. the through-hole lands 216, 216A 216B, are electrically connected at both sides respectively. Thus, the pair of the plane coils 214, 214 attached to both the side surfaces facing each other are electrically connected each other in parallel. The pair of the plane coils 214, 214 are respectively constructed so as to have approximately the same turns and resistance. Thus, a plane coil having a thickness at in a prior art is divided into two coil parts and each of the two coil parts having a thickness $\Delta t/2$ is used as the plane coil 214 of the present invention.

Next, the plurality of the pairs of the plane coils 214, 214 on the FPC 212 are respectively bent to an arcuate cylindrical shape having a predetermined radius, and the ends of the FPC 212 are connected each other by bending the FPC 212 in a direction of an arrow F2 as shown in FIG. 8 and by bonding them each other, thus the coreless coil assembly 210 shown in FIG. 6 is obtained.

In FIG. 10, a connected part of the FPC is shown as an enlarged fragmentary side view taken in the direction of the arrow F3 of FIG. 6, wherein the connected part is formed by causing the through-holes 216A, 216B of semicircle configuration to be soldered each other and causing the pair of the plane coils 214, 214 to be mounted to bridge both the ends of the FPC 212. Thus the cylindrical coreless coil assembly shown in FIG. 6 is obtained.

Generally, as well known, in a motor employing coreless coils each having a predetermined winding number and predetermined magnetic poles, effective magnetic fluxes generating torque are smaller compared with the motor employing the coils with cores each having the same winding number and the same magnetic poles.

However, in the brushless motor 11 of the embodiment, magnetic materials having exceptional magnetic characteristic such as SmCo, Nd—Fe—B are employed for the magnet 66 so as to have the effective magnetic flux being adequate.

Next, a description is given to an operation of the the brushless motor 11 of the embodiment.

When a current is applied to the coreless coil assembly 210 from a driving circuit which controls the direction of the current, the hub 58 on which hard discs 28 are mounted is rotated in a direction of the arrow FA (FIG. 4) or in the reverse direction of the arrow FA by interaction between the magnetic field generated from the coreless coil assembly 210 and the magnetic field of the magnet 66. Thus, the hard discs 28, 28 are rotated relative to the magnetic heads 32. The accesses to desired tracks on the hard discs 28 are given by displacing the magnetic heads 32a, 32b in the traverse directions of the rotation of the hard discs 28, 28.

As mentioned in the foregoing, in this embodiment, the bearing holder 54 and the hub 58 having the disc holder 60 are integrally constructed to form the cylindrical recess 59 in which the coreless coil assembly 210 is erected from the coil holder 62 fixed on the motor base 18 and the coreless coil assembly 210 is extended up to a ceiling of the cylindrical chamber 59 leaving a minute clearance therebetween, and the magnet 66 is provided on the inner wall of the hub 58 facing the coreless coil assembly 210.

In other wards, the hub 58 serves both as a back yoke for the magnet 66 and the disc holder 60. Further, the bearing holder 54 serves both as a supporter for the bearings 50, 52 and a member for forming the wall of the cylindrical recess 59, so that an inner portion of the hub 58 is utilized efficiently, which enables down sizing of the brushless motor 11.

Further, in this embodiment of the brushless motor 11, the coreless coil assembly 210 is employed. Therefore, the coreless coil assembly 210 prevents a core loss and cogging rotation from occurring in the brushless motor 11 which loss and cogging rotation would be possible if a core were built into the coil assembly, and the inductance of the coreless coil assembly 210 is kept small. Thus, an increase of current consumption with high speed rotation is suppressed because of effective torque generated without a loss, so that an efficient and high speed brushless motor without vibration and noise can be realized.

Further, in the embodiment, the upper portion of the bearings 50, 52, i.e. the center hole of the bearing holder 54 is covered with the top cover 70, which effectively prevents the contaminant particles from invading the clean chamber EB from the upper portion of the bearings 50, 52 without providing a magnetic fluid seal.

Furthermore, the bearing holder 54 and the hub 58 are integrally constructed to form the cylindrical recess 59 in which the coreless coil assembly 210 is protrudingly provided, so that the path shown with the arrow FB (FIG. 5) leading from the bearings 50, 52 to the clean chamber EB becomes longer than that of the prior art. In addition, the clearance G1 formed between the outer wall of the bearing holder 58 and the coreless coil assembly 210, and the clearance G3 formed between the coreless coil assembly 210 and the magnet 66 are formed very narrow (for instance, 0.05~0.1 mm) so as to generate effective torque, which clearances effectively serve as the labyrinth path for preventing the contaminant particles from invading the clean chamber EB through the path shown with the arrow FB.

Further, the coreless coil assembly 210 of the embodiment has a construction that a plurality of pairs of coils 214 are provided on both the sides of the FPC 212 having desired print circuits and through-hole lands 216, which enables easy assembling of the coreless coil assembly 210.

[Second embodiment of the brushless motor 21]

Figure 11:
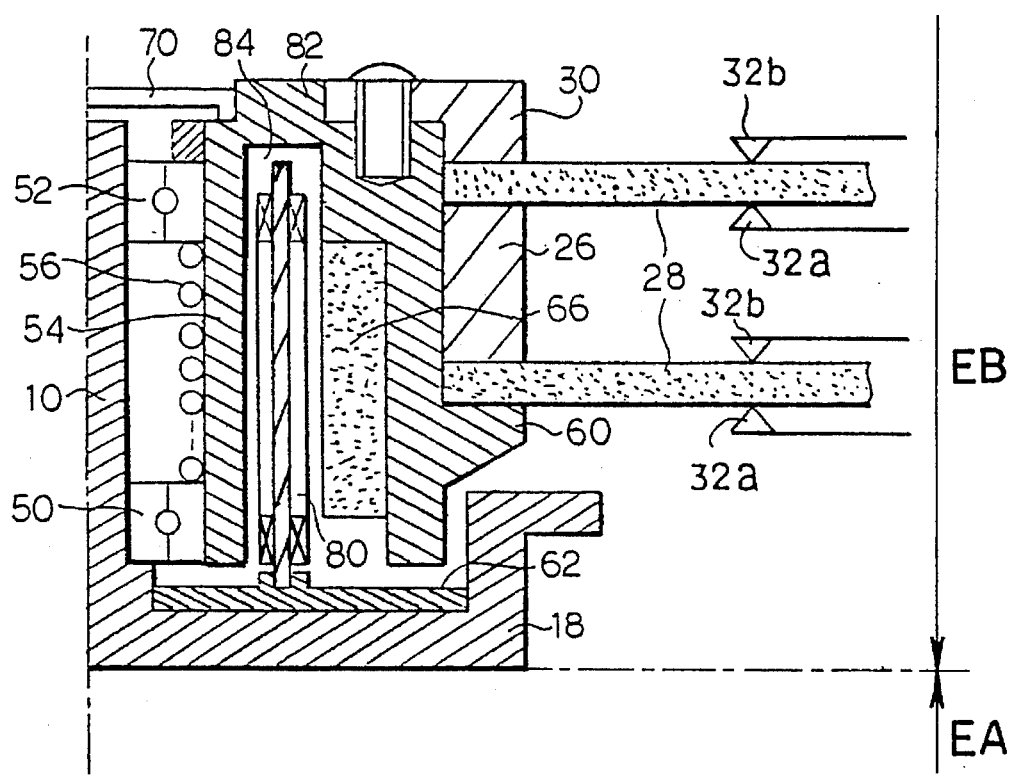
FIG. 11 is a vertical sectional view showing a right half side of a second embodiment of the brushless motor cut along a center axis of a shaft in the present invention.
Figure 12:
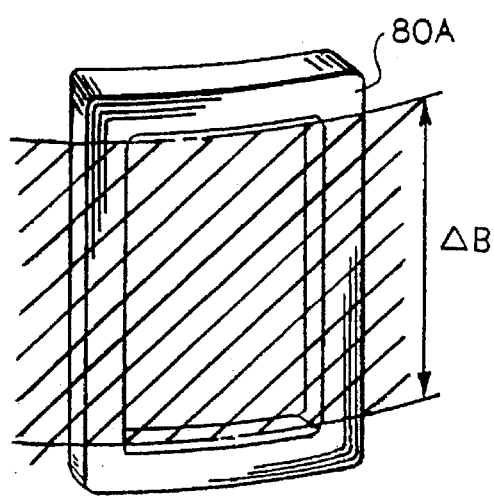
FIG. 12 is a fragmentary perspective view for explaining operations of the second embodiment.

Next, a description is given to a second embodiment of the brushless motor 21 referring to FIGS. 11 and 12, wherein like reference numerals and symbols designate like or corresponding parts in the foregoing drawing and the detailed description is omitted for simplicity.

FIG. 11 is a vertical sectional view showing a right half side of a second embodiment of the brushless motor cut along a center axis of a shaft.

FIG. 12 is a fragmentary perspective view for explaining operation of the second embodiment.

This embodiment is an improvement of the first embodiment of the brushless motor 11, wherein an efficiency of the brushless motor 21 is improved.

Referring to FIG. 11, in this embodiment a cylindrical recess 84 is enlarged upward and a coreless coil assembly 80 is also enlarged upward compared with the coreless coil assembly 210 of the first embodiment 11 shown in FIG. 5, so that unlike the first embodiment, the top and bottom windings of the plane coils 80A do not overlap the magnet 66. In other words, the magnet 66 faces heightwise an empty core area of each of the plane coils BOA.

Thus, the flux produced by the magnet 66 and intersected by the plane coil 80A increases because a length ΔB of the vertical section of the plane coils BOA, which contributes to generate torque, substantially increases, this increases an efficiency of the brushless motor 21.

Further, in this embodiment, the path FB from the bearings 50, 52 to the clean chamber EB shown in FIG. 5 becomes longer, which realizes a highly efficient labyrinth seal.

[Other embodiments of the brushless motor]

The present invention of the brushless motor includes following embodiments:

(1) In the foregoing embodiments, the brushless motors 11, 21 employ 8 magnetic poles and 6 pairs of plane coils 214, or 80A, however, the number of these magnetic poles and coils can be optionally chosen.

(2) The number of the hard discs 28, 28 can be also optionally chosen, and other type discs such as optical discs can be employed instead of the hard discs 28, 28.

(3) Instead of the FPC 212 of the present invention, a molded type coreless coil assembly can be also employed if necessary.

(4) Other components of the present invention can be also optionally chosen. For instance, the bearing holder 54 and the hub 58 can be made of light alloy such as aluminum, and a back yoke and a yoke for holding the magnet, which yokes are made of ferro magnetic material, can be respectively mounted to the bearing holder and the hub.

Next, a description is given to other embodiments of the coreless coil assemblies referring to FIGS. 13~20, wherein like reference numerals and symbols designate like or corresponding parts in the foregoing drawing and the detailed description is omitted for simplicity.

[Second embodiment of the coreless coil assembly 221]

A description is given to a second embodiment of a coreless coil assembly 221 referring to FIG. 13 and FIGS. 14(A)~14(C).

Figure 13:
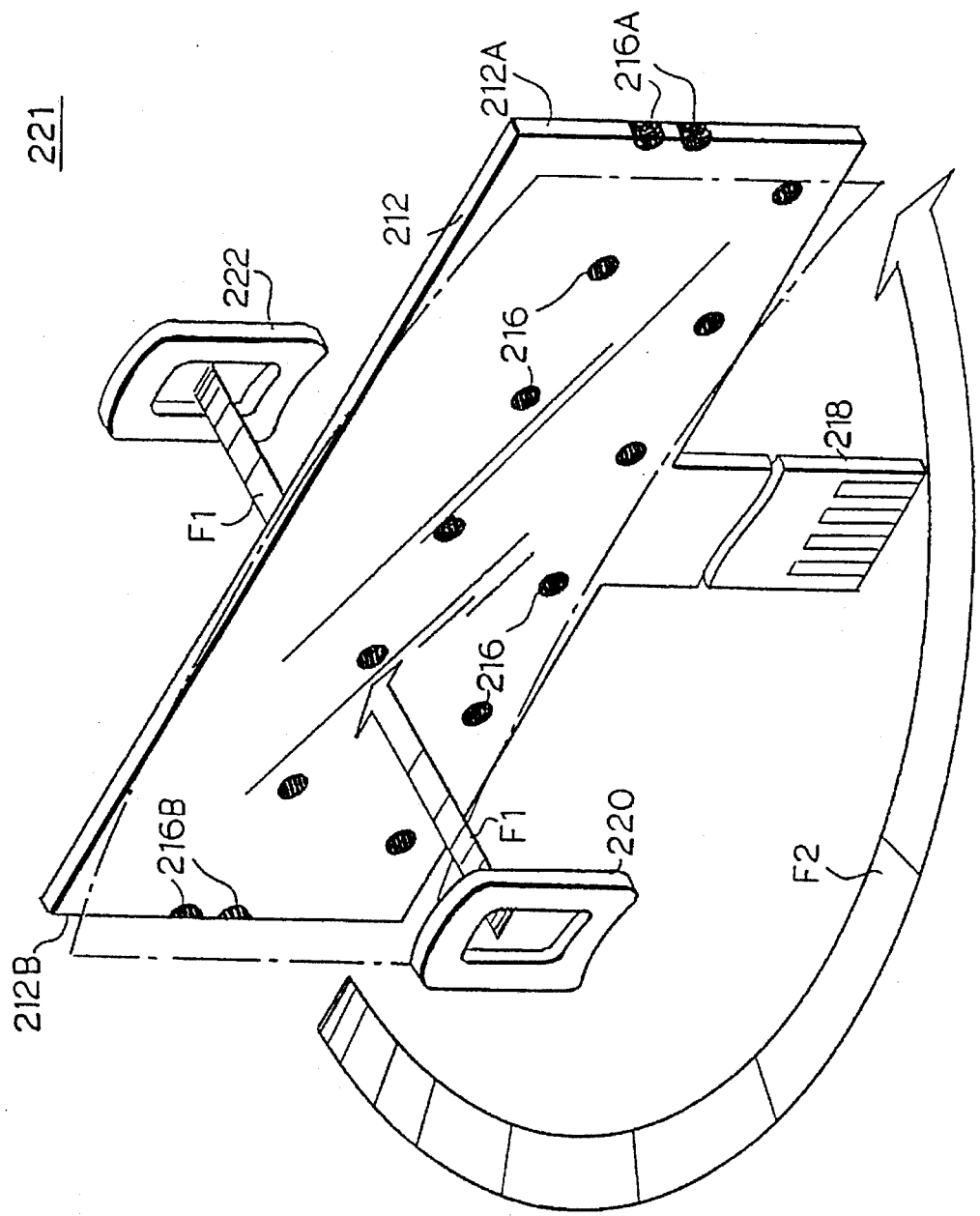
FIG. 13 is a perspective view showing a flexible print circuit of a second embodiment of the coreless coil assembly.
Figure 14:
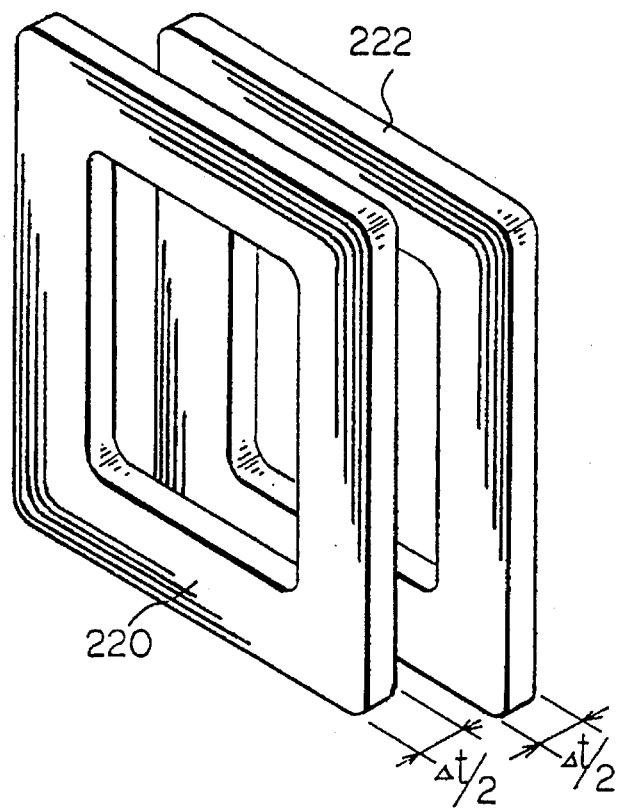
FIGS. 14(A)–14(C) are perspective views of the plane coils used in the second embodiment.
Figure 14:
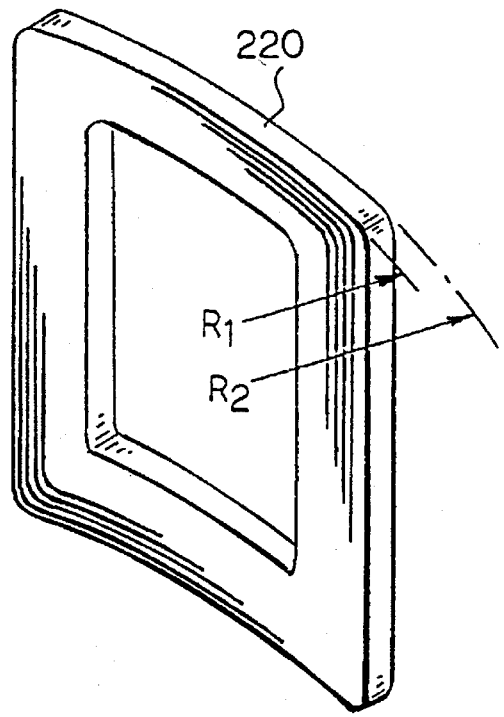
Figure 14:
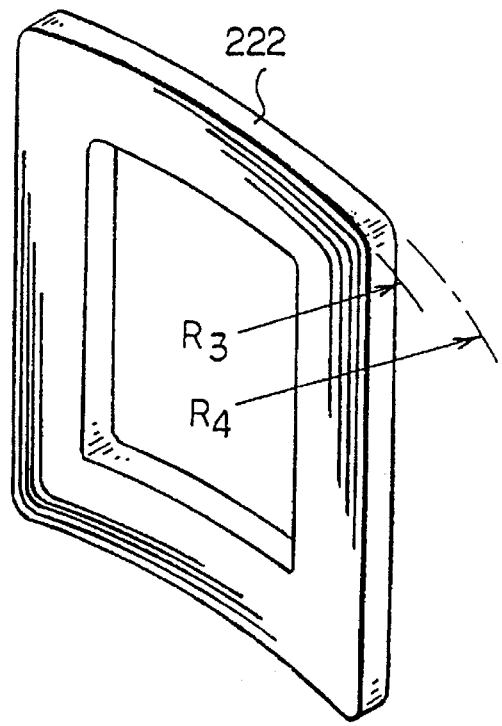

FIG. 13 is a perspective view showing a flexible print circuit of a second embodiment of the coreless coil assembly.

FIGS. 14(A)~14(C) are perspective views for explaining plane coils used in the second embodiment of the coreless coil assembly.

As mentioned in the foregoing embodiment of the coreless coil assembly 210 referring to FIGS. 6~10, the plurality of the pairs of the plane coils 214 on the FPC 212 are respectively bent to be an arcuate cylindrical shape having a predetermined radius, and the ends of the FPC 212 are connected each other by bending the FPC 212 in a direction of an arrow F2 as shown in FIG. 8 and bonding them each other, thus the coreless coil assembly 210 shown in FIG. 6 is obtained.

In the second embodiment of the coreless coil assembly 221, a pair of plane coils 220, 222 to be attached to the FPC 212 are preformed in advance to be an arcuate cylindrical shape shown in FIG. 13.

At first, as shown in FIG. 14(A), a plurality of pairs of plane coils 220, 222 each having a thickness $\Delta t/2$ are formed by winding wires with or without a frame. Then, each of the pair of the plane coils 220, 222 is shaped so as to have an arcuate cylindrical shape conforming to an assembly configuration, thus, the plane coil 220 has an inner radius R1, and an outer radius R2, and the plane coil 222 has an inner radius R3 and an outer radius R4 as shown in FIG. 14(B), 14(C), wherein the radius R2 is approximately equal to the radius R3.

Then, the pair of the plane coils 220, 222 are respectively attached to both the side surfaces of the FPC 212 by means of bonding, and the ends of the FPC 212 are connected each other by bending the FPC 212 in a direction of an arrow F2 as shown in FIG. 13, thus, the coreless coil assembly 221 similar to the first embodiment of the coreless coil assembly 210 shown in FIG. 6 is obtained.

[Third embodiment of the coreless coil assembly 231]

Figure 15:
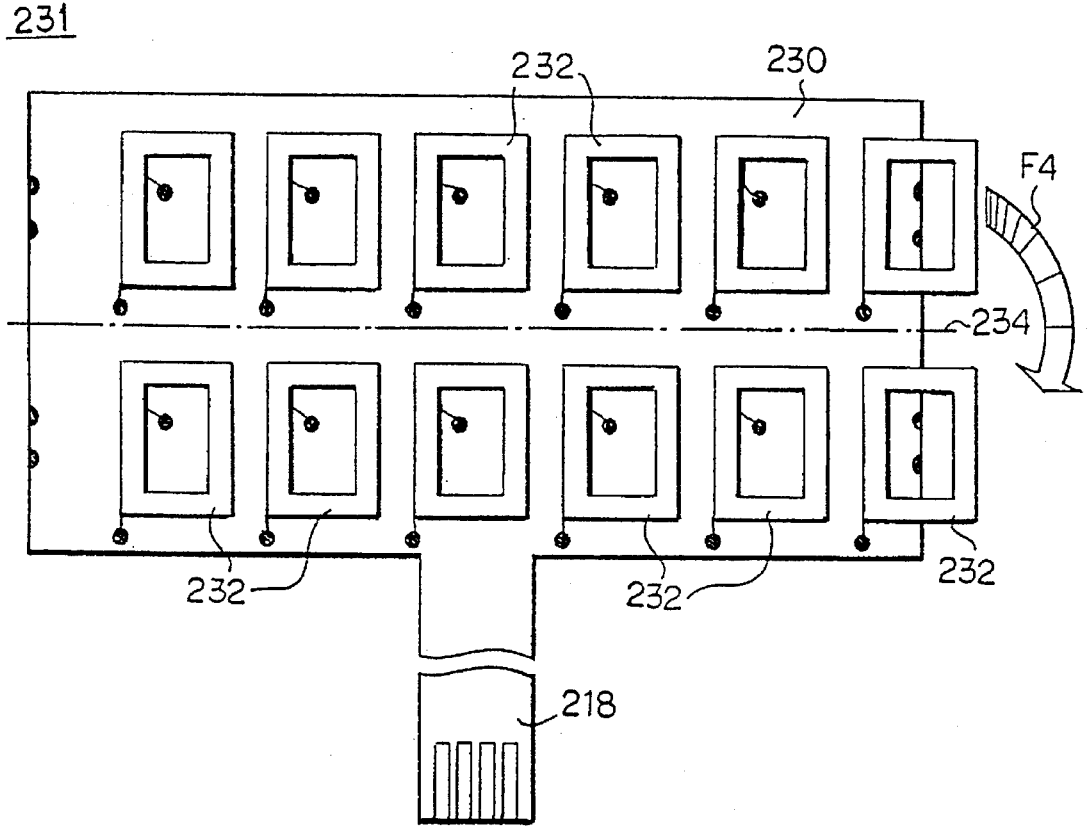
FIG. 15 is a plan view showing a flexible print circuit of a third embodiment of the coreless coil assembly.
Figure 16:
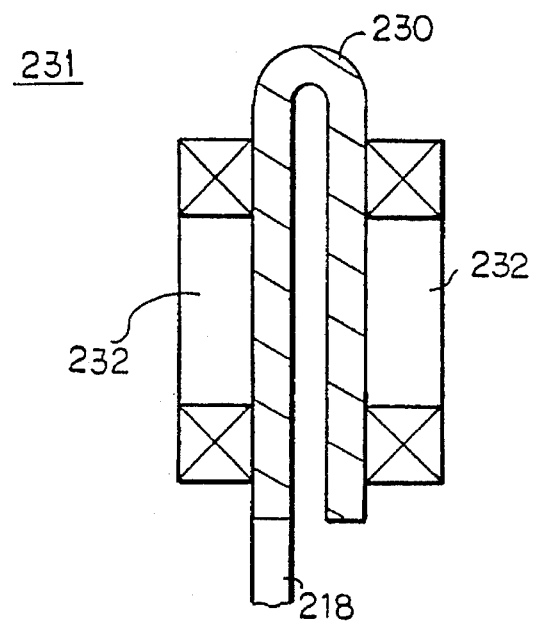
FIG. 16 is a side view showing the third embodiment of the coreless coil assembly.

A description is given to a third embodiment of the coreless coil assembly 231 referring to FIG. 15 and FIG. 16.

FIG. 15 is a plan view showing a flexible print circuit of a third embodiment of the coreless coil assembly.

FIG. 16 is a side view showing the third embodiment of the coreless coil assembly.

Referring to FIG. 15, in this embodiment, the width of a FPC 230 is wider as much as 2-times those of the aforementioned first and second embodiments, and predetermined pieces of plane coils 232 each having a thickness of $\Delta t/2$ and aligned in two parallel rows are disposed and attached to one surface of the FPC 230 in two parallel lines, wherein no coils are mounted on the back surface of the FPC 230.

Then, the upper half of the FPC 230 is folded backward along a chain line in a direction of an arrow F4 as shown in FIG. 16. After that, the FPC 230 is bent like in the case of FPC 212 in the direction of the arrow F2 shown in FIG. 8 and the ends of the FPC 230 is connected each other to obtain the coreless coil assembly 231.

In this embodiment, it is advantageous to increase productivity of the coreless coil assembly 231 because the plane coils 232 are attached to only one surface of the FPC 230.

[Fourth embodiment of the coreless coil assembly 241]

Figure 17:
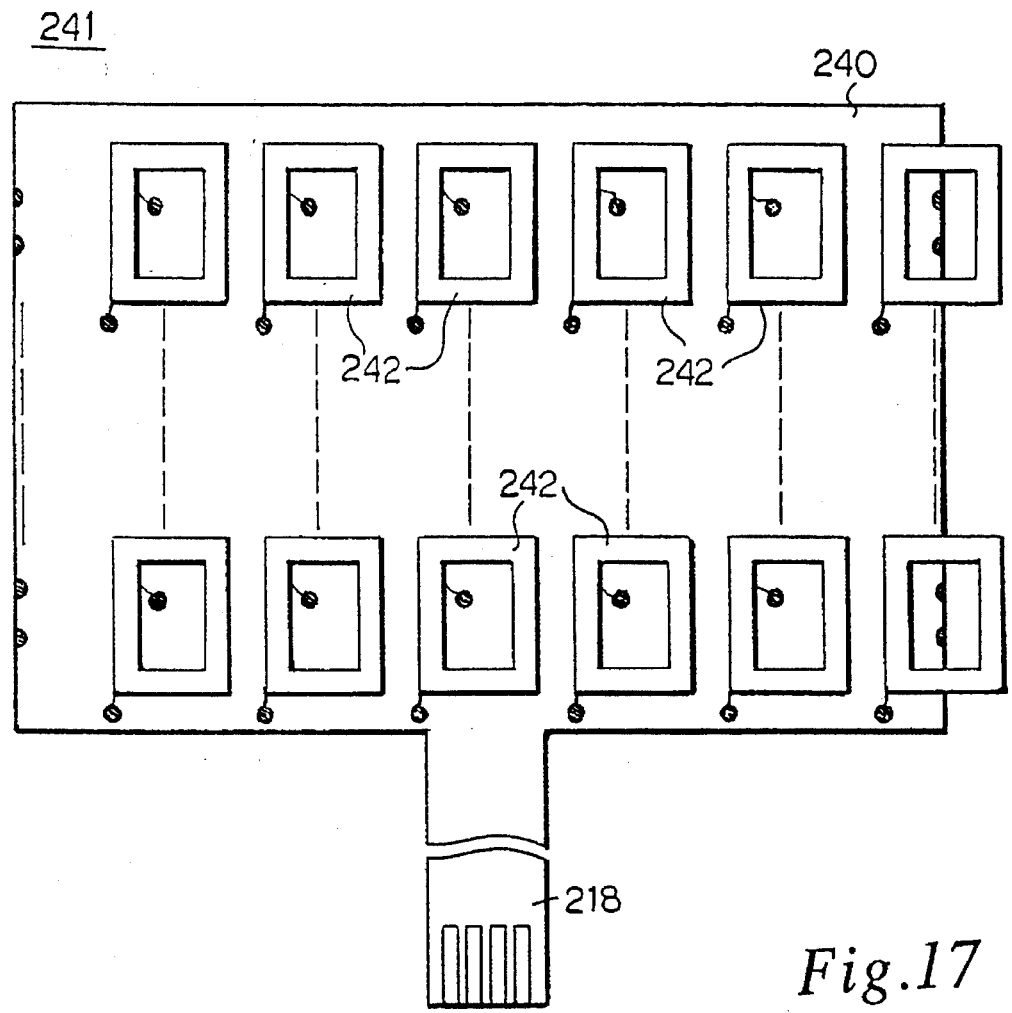
FIG. 17 is a plan view showing a flexible print circuit of a fourth embodiment of the coreless coil assembly.
Figure 18:
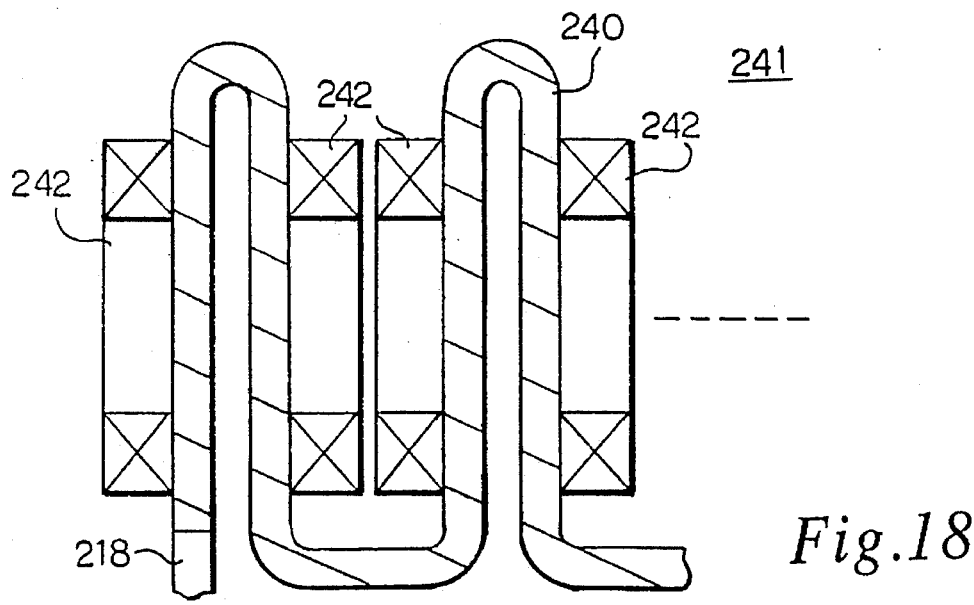
FIG. 18 is a side view showing the fourth embodiment of the coreless coil assembly.

A description is given to a fourth embodiment of a coreless coil assembly 241 referring to FIG. 17 and FIG. 18.

FIG. 17 is a plan view showing a flexible print circuit of a fourth embodiment of the coreless coil assembly.

FIG. 18 is a side view showing the fourth embodiment of the coreless coil assembly.

In this embodiment, an FPC 240 is folded a several times in alternate directions.

Referring to FIG. 17, in this embodiment, the width of a FPC 240 is wider as much as N-times that of the aforementioned second embodiment, and predetermined pieces of plane coils 242 each having a thickness $\Delta t/N$ are aligned and disposed in parallel N-rows on the one surface of the FPC 240. After that, the FPC 240 is folded in the alternative directions for every row of the plane coils 242 as shown in FIG. 18. After that, ends of the FPC 240 are connected each other to obtain the coreless coil assembly 241.

[Fifth embodiment of the coreless coil assembly 251]

Figure 19:
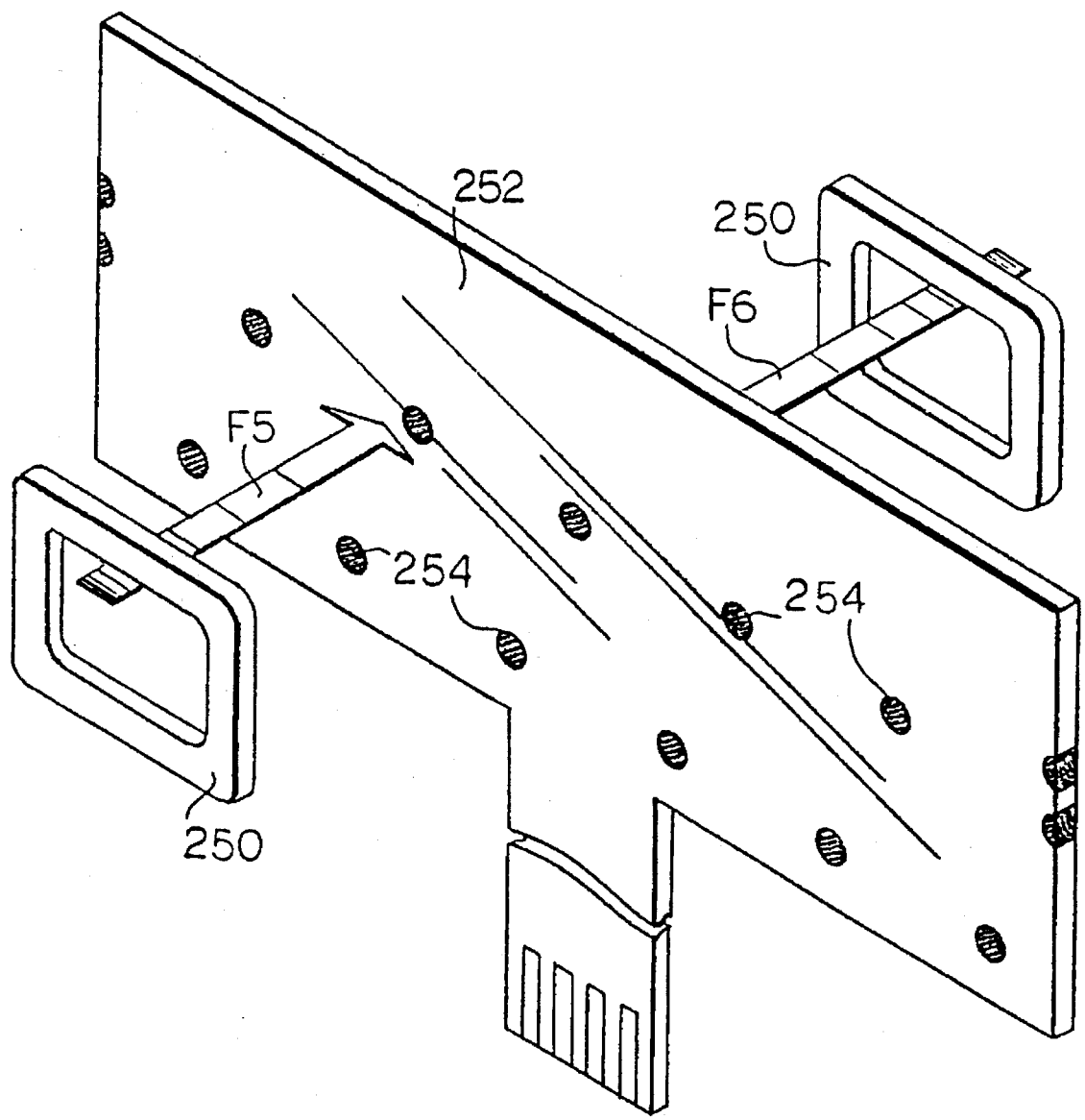
FIG. 19 is a perspective view showing a flexible print circuit of a fifth embodiment of the coreless coil assembly.
Figure 20:
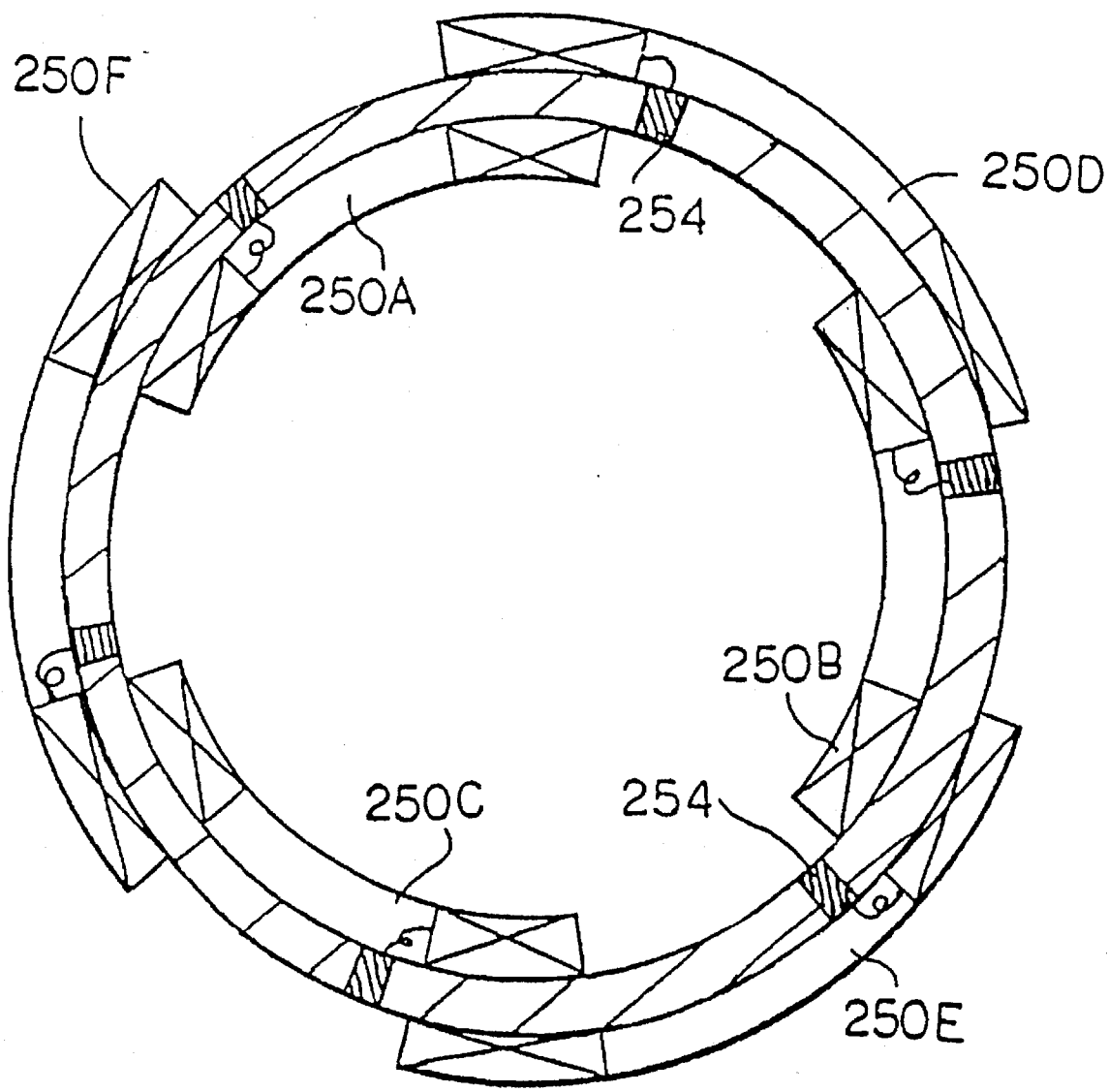
FIGS. 20 is a plan view showing the fifth embodiment of the coreless coil assembly.

A description is given to a fifth embodiment of a coreless coil assembly 251 referring to FIG. 19 and FIG. 20.

FIG. 19 is a perspective view showing a flexible print circuit of a fifth embodiment of the coreless coil assembly.

FIGS. 20 is a plan view showing the fifth embodiment of the coreless coil assembly.

In this embodiment, the brushless motor employs the magnet 66 having 8 poles and 6 pieces of plane coils 250 which are disposed so as to be driven by a 3-phase alternating current.

As shown in FIGS. 19 and 20, a first group of plane coils 250A~250C are attached to one surface of an FPC 252, and a second group of plane coils 250D~250F are attached to the other surface of the FPC 252 in positions displaced from but so as to bridge the first group of the plane coils 250A~250C respectively.

Winding ends of the plane coils 250A~250F are respectively soldered to through-holes 254, and the FPC 252 is formed into a cylindrical coreless coil assembly 251 as shown in FIG. 20, wherein the coreless coil assembly 251 is driven by the 3-phase alternating current.

It should be noted that in this embodiment, the attached positions of the plane coils 252A~252F in the coreless coil assembly 251 increases a mechanical strength of the coreless coil assembly 251 because the upper and lower horizontal portions of plane coils 252A~252F, which do not contribute generation of torque by the coreless coil assembly 251, are attached in a bridging manner to mechanically support the FPC 252 from both sides.

[Other embodiments of the coreless coil assemblies]

The present invention includes following embodiments of the coreless coils:

(1) The printed pattern of the FPC is optionally chosen and other land for soldering can be optionally chosen instead of the through-hole lands.

(2) The plane coils 220, 222 of the second embodiment shown in FIG. 14(A) can be employed as the plane coils used in the third, fourth and fifth embodiments.

What is claimed is:

1. A brushless motor having a stator and a rotor in a clean chamber of contaminant-free atmosphere, the stator comprising a motor base, shaft means provided on the motor base and a plurality of coils mounted on the motor base, the rotor comprising a bearing holder having a center hole for supporting bearing means, a hub connected to the bearing holder for mounting information storage discs and a magnet having magnetic poles provided on an inner wall of the hub facing to the plurality of coils, the rotor including the hub being rotated around the shaft means through the bearing means by causing a magnetic field of the magnetic poles of the magnet to interact with a magnet field generated by the coils in the clean chamber, the brushless motor comprising:

a top cover made of a plate placed on a top of the bearing holder to close the center hold thereof;

a cylindrical chamber defined by an outer wall of the bearing holder and an inner wall of the hub of the rotor; and a cylindrical coreless coil assembly comprising a cylindrical flexible support provided with printed circuits having lands for soldering, and the plurality of the coils disposed at least on one surface of the cylindrical flexible support, winding ends of the plurality of coils being soldered to the lands, the cylindrical coreless coil assembly being erected from the motor base in such a manner that the cylindrical coreless coil assembly protrudes into the cylindrical chamber so as to form a labyrinth path having predetermined clearances narrow and long enough to prevent contaminant particles from invading the clean chamber without providing any magnetic fluid seal in cooperation with the top cover made of the plate.

2. A brushless motor as claimed in claimed 1, wherein the cylindrical flexible support comprises a plurality of flexible support layers by bending a flexible support on which the plurality of the coils without the core are provided.

3. A brushless motor as claimed in claims 1, wherein the plurality of coils are provided on the both surfaces of the flexible support so as to bridge each other.

4. A brushless motor as claimed in claim 1, wherein the plurality of coils are provided on both the surfaces of each of the flexible support layers so as to bridge each other.

* * * * *